United States Patent [19]

Osaka et al.

[11] Patent Number: 4,629,649
[45] Date of Patent: Dec. 16, 1986

[54] INFORMATION RECORDING MEDIUM AND METHOD

[75] Inventors: Yukio Osaka; Takeshi Imura; Toshio Nakashita, all of Higashi-Hiroshima, Japan

[73] Assignee: TDK Corporation, Tokyo, Japan

[21] Appl. No.: 742,303

[22] Filed: Jun. 7, 1985

[30] Foreign Application Priority Data

Dec. 28, 1984 [JP] Japan .................................. 59-275373

[51] Int. Cl.$^4$ ...................... B32B 15/04; G01D 15/34
[52] U.S. Cl. ..................................... 428/209; 346/1.1; 346/76 L; 346/135.1; 427/43.1; 427/261; 430/945
[58] Field of Search ...................... 428/195, 209, 913; 430/945; 346/76 L, 135.1, 1.1; 427/261, 43.1

[56] References Cited

U.S. PATENT DOCUMENTS

| | | | |
|---|---|---|---|
| 4,335,198 | 6/1982 | Hanada et al. | 430/945 X |
| 4,357,616 | 11/1982 | Terao et al. | 430/945 X |
| 4,388,400 | 6/1983 | Tabei et al. | 430/945 X |
| 4,394,661 | 7/1983 | Peeters | 346/76 L |
| 4,500,889 | 2/1985 | Wada et al. | 430/945 X |

Primary Examiner—Thomas J. Herbert
Attorney, Agent, or Firm—Oblon, Fisher, Spivak, McClelland & Maier

[57] ABSTRACT

In an information recording medium comprising a substrate and a recording layer, the recording layer is formed from a germanium-tin material. Recording light may be conducted to the layer where amorphous-crystalline phase transition or crystal form change occurs.

3 Claims, 11 Drawing Figures

INFORMATION RECORDING MEDIUM AND METHOD

BACKGROUND OF THE INVENTION

This invention relates to an information recording medium, and more particularly, to a heat-mode information recording medium as well as a recording method.

Heat-mode information recording media have the advantage that they are not worn or degraded because they are not in contact with writing and reading heads. Active research and development work has been focused to a variety of heat-mode recording media. The heat-mode information recording media are generally classified into two types, pit forming type and phase transition type.

In the information recording medium of phase transition type, recording light, typically a laser beam is directed to the recording layer to induce amorphous-crystalline phase transition at the exposed spot, thereby recording information thereat. The recorded information can be read out by directing reading light to the recorded spot to detect a variation in reflectance or the like.

Most recording media utilizing such phase transition have recording layers of tellurium (Te) based materials, for example, As-Se-Te. Because tellurium-based materials are toxic to the human body, the recent research is to develop substitute materials. As far as the inventors know, no report has been presented as to the discovery of a useful recording medium using a less toxic material instead of the tellurium-based materials.

SUMMARY OF THE INVENTION

It is, therefore, an object of the present invention to provide a novel and improved information recording medium having a recording layer formed of a novel less toxic material rather than the conventional tellurium-based materials.

It is another object of the present invention to provide a method for recording information in such a novel and improved recording medium.

According to a first aspect of the present invention, there is provided an information recording medium comprising a substrate and a recording layer formed thereon and containing germanium and tin in an atomic ratio of Sn/(Ge+Sn) of not more than 0.95.

According to a second aspect of the present invention, there is provided a method for recording information in an information recording medium comprising a substrate and a recording layer formed thereon and containing germanium and tin in an atomic ratio of Sn/(Ge+Sn) of not more than 0.95, wherein recording is carried out by causing amorphous-crystalline phase transition or crystal form change to take place in the recording layer.

BRIEF DESCRIPTION OF THE DRAWINGS

The above and other objects, features, and advantages of the present invention will be readily understood by reading the following description taken in conjunction with the accompanying drawings, in which.

DETAILED DESCRIPTION OF THE INVENTION

Figure 1:
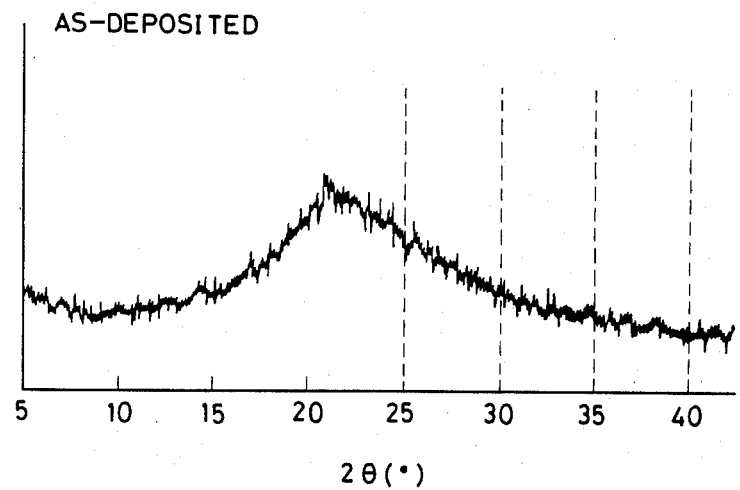
FIGS. 1 and 2 are X-ray diffraction diagrams of a Ge-Sn recording layer as deposited and as annealed, according to one embodiment of the present invention.

The information recording medium of the present invention is prepared by forming a recording layer on a substrate. It may also be prepared by mating two recording medium segments each comprising a substrate and a recording layer thereon such that one recording layer is opposite to the other recording layer.

The substrates used herein include flat surface members such as plates and discs formed of glass, resins and the like. Since light is often used as recording means, highly light-transmissive glass and resins are preferably employed, allowing for writing and reading operations from the rear side of the substrate. Preferably, that surface of the substrate on which the recording layer is to be formed is provided with a plurality of tracking channels.

On the substrate is formed or deposited a recording layer which contains germanium (Ge) and tin (Sn) in an atomic ratio of Sn/(Ge+Sn) of not more than 0.95 and preferably between 0.05 and 0.95.

Recording layers of Ge—Sn system having an atomic ratio Sn/(Ge+Sn) of more than 0.95 are difficult to be formed amorphous. Then, application of heat to the recording layer as by light exposure cannot induce amorphous-to-crystalline phase transition or crystal form change (e.g., grain size change), failing to record. Ge—Sn materials having atomic ratio Sn/(Ge+Sn) of less than 0.05 have higher crystallization temperatures and require extra energy to accomplish recording. Advantageously, Ge—Sn materials having atomic ratio Sn/(Ge+Sn) in excess of 0.05 have relatively low crystallization temperatures and thus require relatively low heat energy to induce phase transition or crystal form change in recording. Ge—Sn materials having atomic ratios between 0.15 and 0.5 are excellent in both crystallization temperature and stability.

The recording layer may be formed by any desired dry coating techniques including evaporation, sputtering, and ion plating. The recording layer may have a thickness of from about 20 nm to about 1 μm.

If desired, any of well-known stabilizing layers and heat absorbing layers may be formed between the substrate and the recording layer and/or on the recording layer, thereby preventing deterioration of the recording layer and improving heat efficiency in recording operation. Also any of various protective layers may be applied to the rear surface of the substrate.

Information may be recorded in the information recording medium having the recording layer formed on the substrate as described above, by applying light or heat energy thereto. The recording light generally comprises semiconductor laser.

Exposure of the recording layer to recording light produces an exposed spot where amorphous-crystalline phase transition takes place, accomplishing recording. That is, recording is carried out by making use of amorphous-to-crystalline or crystalline-to-amorphous phase transition.

In addition to such phase transition, recording may also be accomplished through a change in crystal form. The crystal forms to be changed include microcrystal diameter, crystal structure or morphology, crystal orientation, and crystallinity.

The recorded data may be read out by conducting reading light to the recorded spot and detecting a change in reflectance or other characteristics in the recorded spot. For instance, a certain Ge—Sn material exhibits a reflectance of about 60% in amorphous state at a wave length of 830 nm and changes its reflectance by about 5–20% when it crystallizes.

As described above, the information recording medium of the present invention comprises a recording layer formed of a Ge—Sn material which undergoes amorphous-crystalline phase transition or crystal form change when exposed to recording light. Information recording can be achieved by making use of this phenomenon. As compared with the conventional toxic Te-based recording medium, there is obtained a recording medium characterized by low toxicity and at least equivalent recording/reproducing performance. The medium of the invention is also improved in weathering resistance over the Te-based medium.

In order that those skilled in the art will better understand the practice of the present invention, examples of the present invention are given below by way of illustration and not by way of limitation.

EXAMPLE

A Ge—Sn material was deposited onto a glass substrate by sputtering to form a thin-film layer having a thickness of 180 nm and serving as a recording layer. This recording layer had an atomic ratio of Sn/(Ge+Sn) equal to 0.35 as measured by XPS. The layer was then annealed at 200° C. for 10 minutes.

Figure 2:
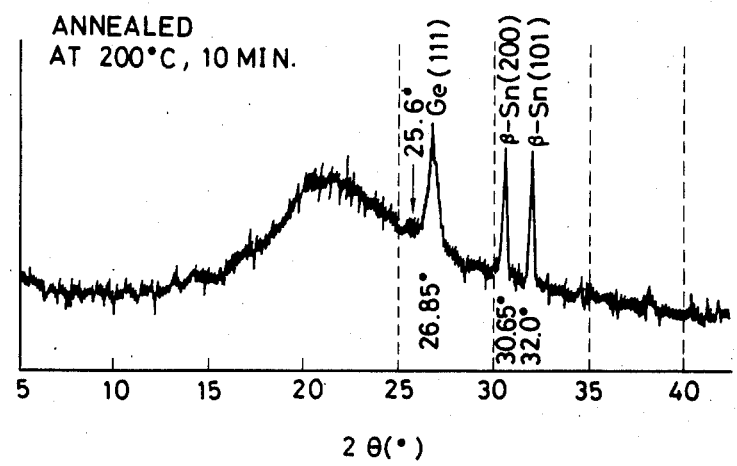
Figure 3:
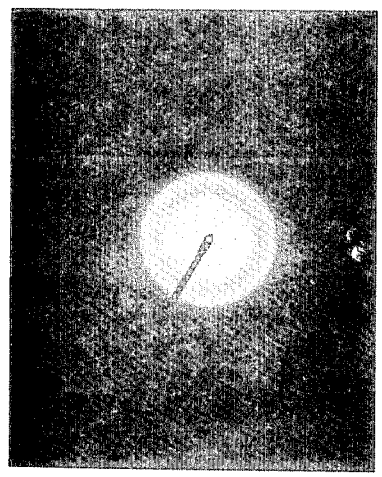
FIGS. 3 and 4 are photomicrographs showing the crystalline structure of the Ge-Sn recording layer as deposited and as annealed, by electron ray diffractometry.
Figure 4:
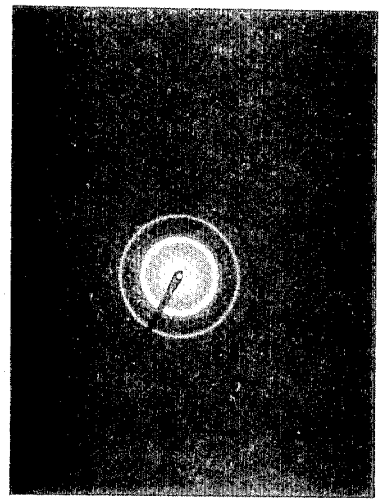

X-ray diffraction analysis was carried out on the recording layer both after deposition and after annealing. It was found that the Ge—Sn material underwent transition from amorphous to crystalline phase. FIG. 1 shows the result of X-ray diffraction analysis of the as-deposited layer and FIG. 2 shows the result of X-ray diffraction analysis of the as-annealed layer. FIG. 3 is a photomicrograph showing the as-deposited layer and FIG. 4 is a photomicrograph showing the as-annealed layer both by electron ray diffractometry. These data prove that the Ge—Sn film layer yields amorphous-to-crystalline phase transition under the influence of a heat energy.

Figure 5:
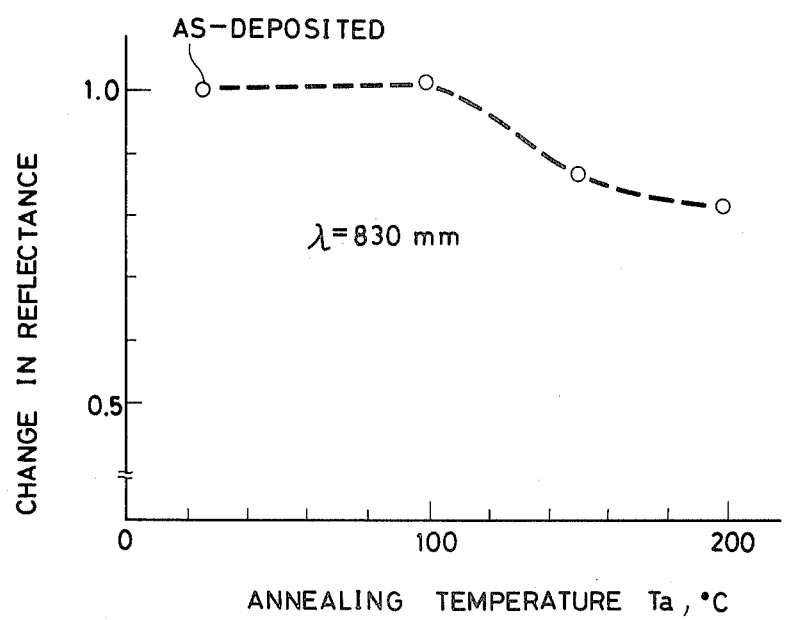
FIG. 5 is a diagram showing the reflectance of the Ge-Sn recording layer as deposited and after annealed at 100°, 150°, and 200° C.

A light beam having a wave length of 830 nm was directed onto the recording layer both after deposition and after annealed at temperatures of 100° C., 150° C. and 200° C. in order to measure the reflectance of the layer. FIG. 5 shows the reflectance of the recording layer as a function of the annealing temperature. The reflectance of the as-deposited layer at 830 nm is changed or reduced by about 20% through the phase transition from the deposited or amorphous phase to the annealed or crystalline phase.

Figure 8:
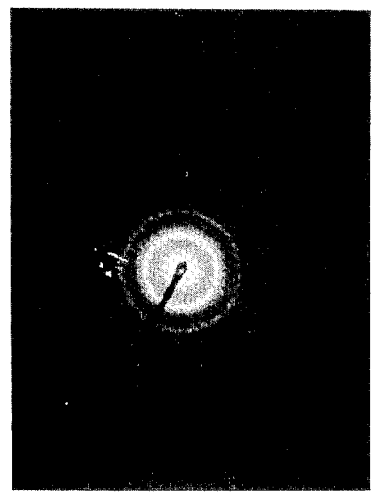
FIG. 8 is a photomicrograph showing the crystalline structure of the as-deposited Ge—Sn recording layer shown in FIG. 6.
Figure 6:
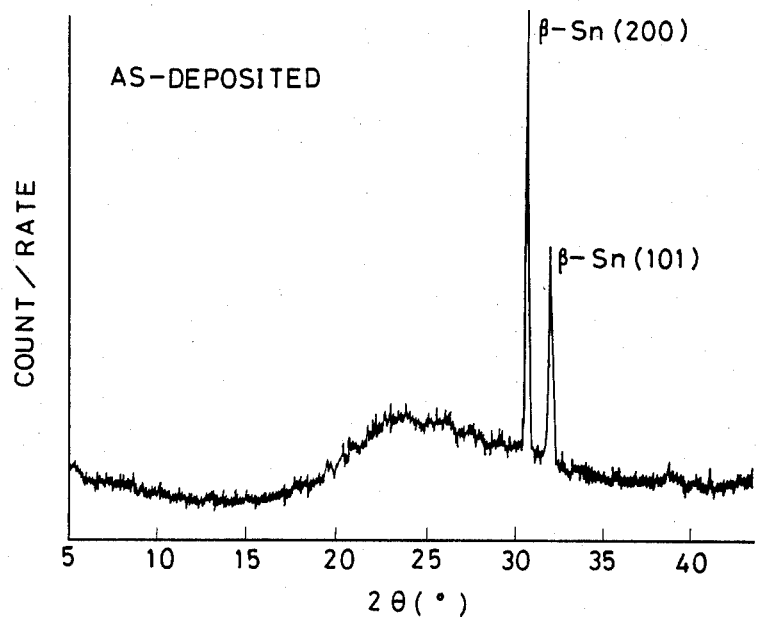
FIGS. 6 and 7 are X-ray diffraction diagrams of a Ge—Sn recording layer having an Sn/(Ge+Sn) ratio of 0.98 outside the scope of the present invention, as deposited and as annealed.
Figure 7:
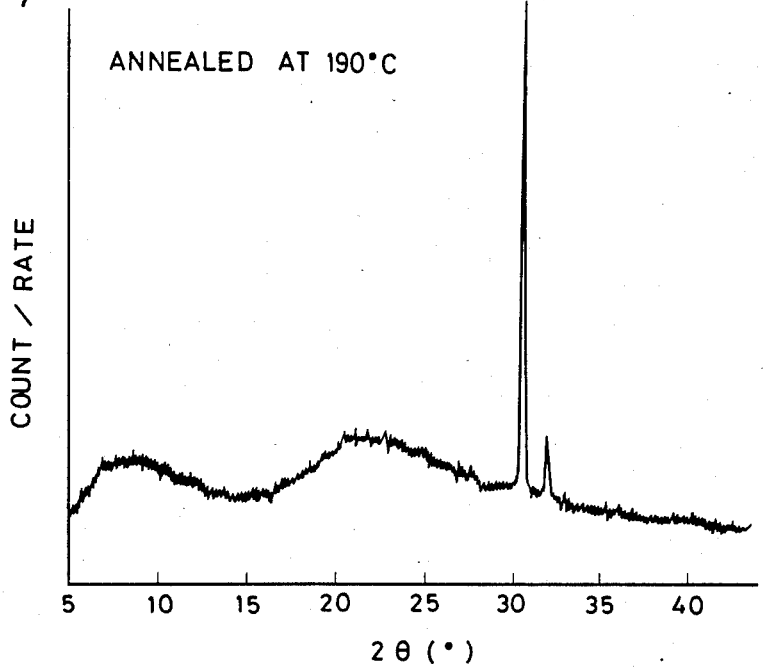

For comparison purpose, a recording layer of a Ge—Sn material having an atomic ratio Sn/(Ge+Sn) equal to 0.98 was deposited by sputtering. FIG. 6 shows the result of X-ray diffraction of the as-deposited layer and FIG. 7 shows the result of X-ray diffraction of the layer as annealed at 190° C. It is evident that this Ge—Sn material is crystalline when deposited and undergoes no phase transition by heat energy. FIG. 8 is a photomicrograph showing the as-deposited layer by electron ray diffractometry.

Figure 9:
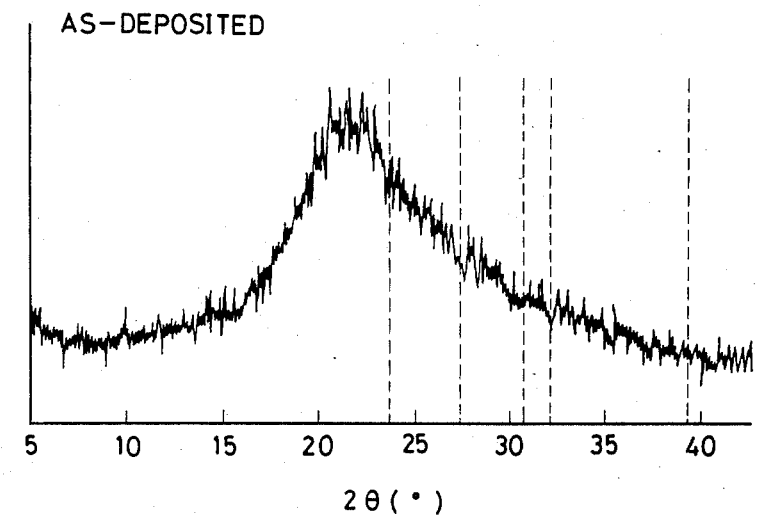
FIGS. 9 and 10 are X-ray diffraction diagrams of a Ge-Sn recording layer having an Sn/(Ge+Sn) ratio of 0.03 outside the scope of the present invention, as deposited and as annealed.
Figure 10:
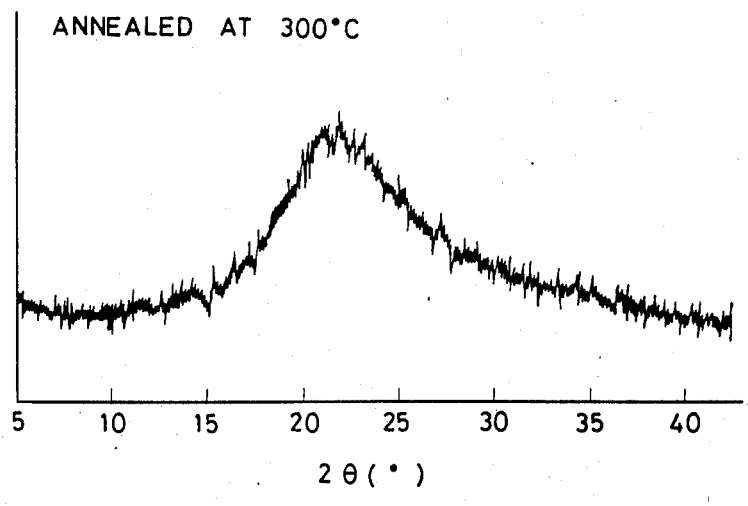

Another recording layer of a Ge—Sn material having an atomic ratio Sn/(Ge+Sn) equal to 0.03 was similarly sputtered for comparison purpose. FIG. 9 shows the result of X-ray diffraction of the as-deposited layer and FIG. 10 shows the result of X-ray diffraction of the layer as annealed at 300° C. It is evident that the Ge—Sn material of this composition is amorphous both after deposition and after annealing.

Figure 11:
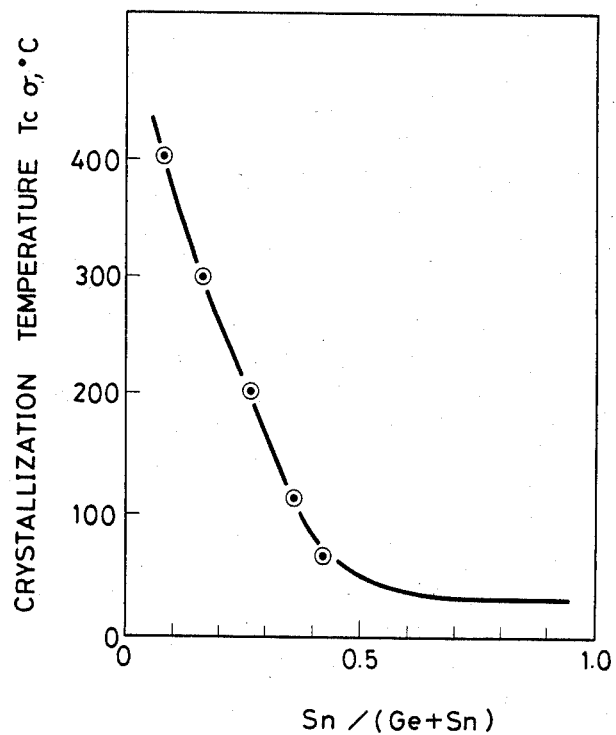
FIG. 11 is a diagram showing the crystallization temperature of Ge—Sn materials as a function of Sn/(Ge+Sn) ratio.

Ge—Sn samples having different compositions were deposited into layers in accordance with the above-described procedure and measured for crystallization temperature. The crystallization temperature is a temperature at which a material starts crystallizing. The results are shown in FIG. 11. As seen from FIG. 11, those Ge—Sn materials having Sn/(Ge+Sn) ratios of more than 0.95 are already crystallized when deposited and not converted into an amorphous state whereas those materials having Sn/(Ge+Sn) ratios of less than 0.05 remain amorphous even after being annealed at 400° C.

For the samples within the scope of the present invention, recording and reading operations were carried out using semiconductor laser beams having a wavelength of 830 nm and high and low intensities, respectively. The samples performed satisfactorily in both recording and reproducing operations. The comparative samples having Sn/(Ge+Sn) ratios of 0.03 and 0.98 were not successful in recording and reproducing.

I claim:

1. An information recording medium comprising a substrate and a recording layer formed thereon consisting essentially of germanium and tin in an atomic ratio of Sn/(Ge+Sn) of 0.05 to 0.95.

2. An information recording medium according to claim 1 wherein the atomic ratio Sn/(Ge+Sn) ranges from 0.15 to 0.5.

3. A method for recording information in an infomation recording medium comprising a substrate and a recording layer formed theron consisting essentially of germanium and tin in an atomic ratio of Sn/(Ge+Sn) of 0.05 to 0.95, wherein recording is carried out by causing amorphous-crystalline phase transition or crystal form change to take place in the recording layer.

* * * * *